United States Patent [19]

Amoroso, Jr.

[11] 3,829,778

[45] Aug. 13, 1974

[54] CALL APPARATUS IN A SINGLE OSCILLATOR MICROWAVE TRANSCEIVER

[75] Inventor: Salvatore Amoroso, Jr., Fairfield, Conn.

[73] Assignee: United Aircraft Corporation, East Hartford, Conn.

[22] Filed: Mar. 26, 1973

[21] Appl. No.: 345,141

[52] U.S. Cl. ........................ 325/17, 325/20, 343/179

[51] Int. Cl. ............................................ H04b 1/40

[58] Field of Search ............ 343/100 R, 100 S, 175, 343/179, 180, 181; 325/17, 18, 19, 20, 24, 53, 54, 55, 419

[56] References Cited

UNITED STATES PATENTS

| | | | |
|---|---|---|---|
| 2,500,795 | 3/1950 | Bruck et al. | 325/20 X |
| 2,653,315 | 9/1953 | Wheeler | 325/20 X |
| 2,757,279 | 7/1956 | Vosburgh | 325/20 X |
| 3,202,917 | 8/1965 | Kawahashi et al. | 325/20 |
| 3,413,554 | 11/1968 | Yates et al. | 325/17 |

*Primary Examiner*—Benedict V. Safourek
*Attorney, Agent, or Firm*—M. P. Williams

[57] ABSTRACT

Call apparatus, in a single oscillator transceiver in which a portion of the transmitter oscillator energy is mixed with received energy so as to provide received signals on an intermediate frequency carrier, for amplification in an FM receiver, includes a broad beam antenna coupling energy into the transmission line between an information transmit/receive antenna and the information FM receiver channel. A calling signal received by the broad beam antenna is passed through the same single ended mixer and preamplifier as are received information signals; from the preamplifier, calling signals are passed to a narrow band AM receiver having an IF frequency which is one half of the frequency of the IF amplifier/limiter of the information receiver channel; the output of the narrow band AM receiver feeds a detector which operates a signaling device. Systems employ pairs of such transceivers, wherein one normally transmits at a frequency higher by the IF frequency than the other, such that each can generate its IF frequency from a portion of its transmitter oscillator output. To call another transceiver, the frequency of the transmitter oscillator is swept at a low frequency rate about a frequency half way between the normal transmit/receive frequencies.

10 Claims, 1 Drawing Figure

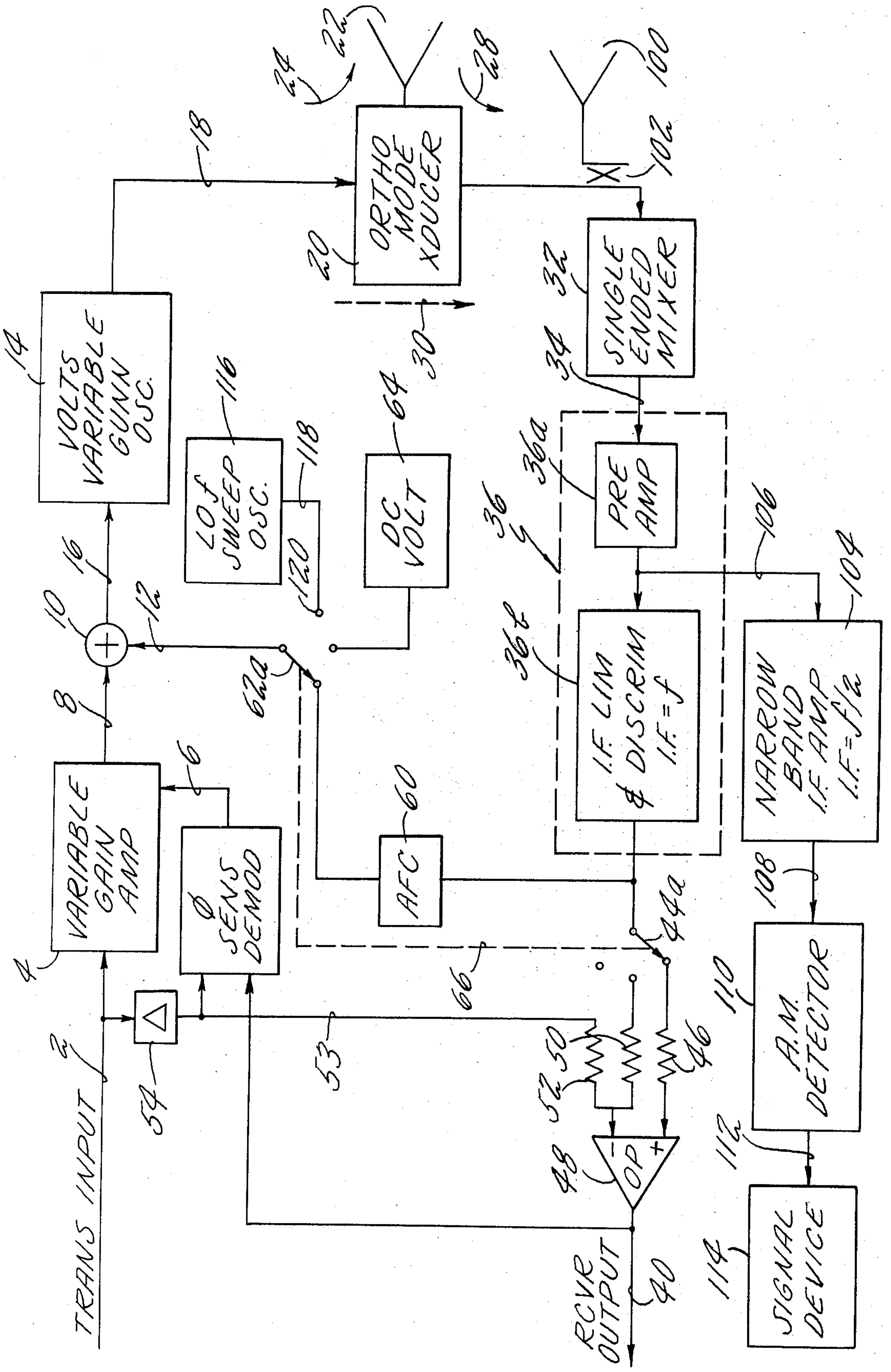
TRANS INPUT
VARIABLE GAIN AMP
Ø SENS DEMOD
VOLTS VARIABLE GUNN OSC.
LO f SWEEP OSC.
DC VOLT
AFC
ORTHO MODE XDUCER
SINGLE ENDED MIXER
PRE AMP
I.F. LIM & DISCRIM I.F.=f
NARROW BAND I.F. AMP I.F.=f/2
A.M. DETECTOR
SIGNAL DEVICE
OP
RCVR OUTPUT

CALL APPARATUS IN A SINGLE OSCILLATOR MICROWAVE TRANSCEIVER

BACKGROUND OF THE INVENTION

1. Field of Invention

This invention relates to transceivers, and more particularly to calling apparatus in single oscillator microwave transceivers.

2. Description of Prior Art

In order to avoid the necessity of laying cable, such as in ship-to-ship communication, or in short range communication between office buildings in cities, it has long been known to use radio transmitting/receiving equipment (transceivers). In order to limit the interference between one communication link and another, and to relieve the crowding of various frequency bands, it has recently been common to employ higher and higher frequencies for transceiver communication links. The use of such transceivers for commercial purposes require that they be available at a reasonable cost; in addition, in certain areas such as downtown Manhattan, the frequency spectrums even at a few gigahertz (GHz) are becoming extremely crowded. A possible solution is the employment of microwave communication links having still higher frequencies. However, when the frequencies of transceivers reach tens of gigahertz, the oscillators necessary to control the frequency thereof must either comprise Klystrons or solid-state oscillators (Gunn, IMPATT, oscillator/multipliers, etc.) which are extremely expensive and may comprise a considerable portion of the cost of a transceiver.

In my commonly-owned copending application Ser. No. 337,609, Filed Mar. 2, 1973, entitled SINGLE OSCILLATOR MICROWAVE TRANSCEIVER, there is disclosed a single oscillator microwave transceiver in which a voltage variable oscillator feeds an FM modulated signal to be transmitted to an orthomode transducer connected to a dual polarization antenna, another port of the orthomode transducer feeding received FM signals to a single ended mixer, the output of which is passed through an FM receiver. The orthomode transducer leaks a portion of the transmitted wave to the single ended mixer for use in lieu of a local oscillator, thereby limiting the requirements to a single microwave oscillator. Nominal frequency control is applied in one of two communicating transceivers, and an automatic frequency control loop is provided in the other, whereby one frequency slaved to the other.

As is known in the art, microwave transmitters are primarily used for line of sight communication, so as to provide secure communication (as in military ship-to-ship applications), or to avoid interference in crowded frequency spectra where transceivers are used in lieu of expensive cable or phone lines (as in building to building interoffice communication and short-distance data links). In such applications, transceivers typically employ highly directional antennas to minimize interference and unwanted monitoring. However, this renders it difficult, particularly in multidirectional applications (such as ship-to-ship), for one unit to signal another that communication is desired. Therefore, calling apparatus has previously been proposed for use with directional transceivers.

However, calling apparatus known to the prior art normally involves substantial duplication of the entire information receiving channel, scanning of the antenna, and other complexities which tend to raise the cost of the unit by some significant percentage.

SUMMARY OF THE INVENTION

The object of the present invention is to provide improved calling apparatus for microwave transceivers. Another object of the present invention is to provide improved, low cost calling apparatus in a single oscillator microwave transceiver.

In accordance with the present invention, calling apparatus for a single oscillator microwave transceiver employs a broad beam antenna and a narrow band calling receiver. According to the invention, calling signals are coupled into the information receiver transmission line, which signals are mixed in the normal receiver mixer, but are passed through a calling signal receiver channel to activate a signaling device. According further to the invention, the lower gain of a broad beam antenna is compensated for by a high gain narrow band calling signal receiver. In still further accord with the present invention, in single oscillator transceivers which transmit at a frequency separated from the transmission frequency of the other by the IF frequency of both, whereby each may act as its own local oscillator, the calling signal receiver has an IF frequency which is half of the frequency of the IF stages of the information receiver and there is provided means for sweeping the transmitter frequency of a calling transceiver at a slow rate about a frequency which is midway between the normal transmission and receiving frequencies, thereby to sweep through the calling IF frequency of a transceiver being called when it is in an operating mode, without regard to whether it is operating at the higher or lower frequency. In accordance still further with the invention, the receivers may share the mixer-matching preamplifier.

The present invention provides an extremely low cost calling apparatus for a single oscillator microwave transceiver. Precise frequency control over an interrogating unit (one transmitting a call signal to another) is eliminated by means of the slow sweeping of the oscillator frequency of the interrogating unit. Use of a broad beam antenna, which in fact may be omnidirectional if desired, does not affect the security of the system, since the transmit pattern is still highly directional; but, it eliminates need for a scanning system which would be required if a narrow beam antenna were used when establishing contact. Employing a very narrow band IF amplifier in the calling channel compensates for the low gain of the broad beam antenna, so that sensitivity of the call channel can be made comparable to that of the information channel, even though the called unit may not be pointed directly at the interrogating unit. The calling channel may utilize the mixer and preamplifier of the information channel receiver, thereby providing the calling function at extremely low cost.

Other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a simplified schematic block diagram of a transceiver with calling apparatus in accordance with the present invention.

DESCRIPTION OF THE PREFERRED EMBODIMENT

Referring now to the drawing, the transceiver disclosed in the aforementioned copending application is shown in its entirety, bearing the reference numerals between 2 and 60, such reference numerals being the same as those utilized for like parts in the aforementioned copending transceiver application. The basic transceiver is described only briefly herein; for a more detailed explanation, reference may be had to the aforementioned copending application.

Signals to be transmitted, comprising transmitter input modulation, are applied on a signal line 2 to a variable gain amplifier 4. Th signals on the line 2 may comprise analog signals (such as voice or telemetry information) or digital signals, as desired. A variable gain amplifier 4 is responsive to an automatic gain control (AGC) signal on a line 6 to provide modulation signals on a line 8, the gain of which is level adjusted so as to permit complete cancellation of these signals from received signals. The line 8 is connected to a video summing unit 10 which sums the signal on the line 8 with a DC signal on a line 12 that controls the nominal or center frequency of a voltage variable oscillator 14 connected to the summing unit 10 by a line 16. Thus, a DC signal on the line 12 determines the center or carrier frequency of the oscillator 14, whereas the modulation signal on the line 8 controls the time variations and limits of frequency excursion of the FM modulation to be impressed on the carrier frequency of the oscillator 14.

The output of the oscillator 14 is applied by a suitable microwave transmission line 18 (such as a waveguide) to an orthomode transducer 20, which is a polarization sensitive three port circulator having a controlled bypass or leakage characteristic. The bulk of the energy in the transmission line 18 is coupled by the orthomode transducer 20 to a narrow-beam antenna 22, as indicated by an arrow 24. The energy received at the antenna 22 (from a remote transmitter operating at a related frequency) is applied to a transmission line 26 as indicated by an arrow 28. In addition, however, the orthomode transducer 20 is adjustable to provide a controlled amount of leakage from the transmission line 18 to the transmission line 26 as indicated by the dashed arrow 30. The energy leaked through the orthomode transducer from the transmission line 18 to the transmission line 26 is used in lieu of a local oscillator signal for mixing with the received signal passed by the orthomode transducer 20 from the antenna 22 to the transmission line 26. Thus both the received signal and a small signal from the oscillator 14 appear on the transmission line 26, and these signals are applied to a single ended mixer 32. The output of the single ended mixer 32 is applied by a suitable transmission line 34, which may preferably comprise coaxial cable, to an FM receiver 36 which typically includes a matching preamplifier 36*a* designed to interface properly with the output of the single ended mixer, followed by limiting IF amplifiers and a discriminator 36*b* which supplies simply the audio or video output which is desired. In this case, however, the output of the FM receiver 36 contains not only the video which comprises the modulation on the carrier wave received at the antenna 22 from a remote transmitter, but also the modulation that is included in the signal of the oscillator 14 which is leaked through the orthomode transducer to serve as a local oscillator signal. This comprises the transmitter modulation, and it must be cancelled from the receiver modulation in order to provide a receiver output signal on a line 40 which is a faithful reproduction of the modulation of the signal received at the antenna 22 from the remote transmitter.

The output of the FM receiver 36 is applied over a line 42 to a switch 44 which can pass signals through a first resistor 46 to a positive input of an operational amplifier 48 (as in the position shown in the drawing) or can pass signals through a resistor 50 to the minus input of the operational amplifiers 48. Another resistor 52 receives signals on a line 53 from the output of a delay unit 54 which in turn is responsive to the transmitter input modulation signal on the line 2. The delay period for the delay unit 54 is set to equal circuit propagation time from the line 2 through the variable gain amplifier 4, the oscillator 14, the transducer 20, the mixer 32, the receiver 36, and the amplifier 48 to the line 40. Thus any of the transmitted modulation which is not completely cancelled in the operational amplifier 48 and therefore appears on the line 40 will be exactly in phase with the delayed transmitter modulation output of the delay unit 54. The output of the delay unit 54 on the line 53 as well as the output of the operational amplifier 48 on the line 40 are applied to a phase sensitive demodulator 56, the output of which comprises the AGC signal on the line 6. The AGC circuit (including the operational amplifier 48, the phase sensitive demodulator 56 and the variable gain amplifier 4) accommodates all the scale factors of the entire system, thereby automatically ensuring cancellation of the transmitter input modulation from the output of the FM receiver 36.

In order to ensure that two transceivers of the type illustrated in the drawing are operating at frequencies separated only by the design IF frequency of the FM receiver 36, so that the difference between the local signal leaked from the transmission line 18 to the transmission line 26 and the received signal passed from the antenna to the transmission line 26 will be equal to the IF frequency, an automatic frequency control (AFC) circuit 60 is connected between the output of the FM receiver 36 and the video summing amplifier 10. The output of the AFC circuit 60 is applied through a switch 62 to the signal line 12; with the switch in the position shown, the AFC circuit 60 is in the loop, and controls the carrier frequency of the oscillator 14. However, a second transceiver of the design as that shown herein, when operating with the one shown herein, will have its switch 62 transferred to the opposite position shown, thereby providing a DC voltage from a source 64 to a signal line 12 to control the carrier frequency of the related oscillator 14. Thus, one oscillator is only nominally controlled as to frequency by the DC source, and the oscillator of a transceiver which is receiving therefrom is locked to it, by the difference of the IF frequency, by means of the AFC circuit 60. If desired, the switch 44 and the switch 62 can be ganged together as illustrated by the dashed line 66.

The switch 44 accommodates the differing polarity of the output of the discriminator within the FM receiver 36 in dependence upon whether the received information is received at a carrier frequency lower or higher than that of the oscillator 14.

A calling apparatus in accordance with the present invention is designated in the drawing by reference numerals 100 et seq. A broad beam antenna 100 is coupled by a standard microwave coupler 102 to the transmission line 26 so that energy received thereat is applied to the single ended mixer 32, along with the energy from the oscillator 14 which is leaked thereinto by the orthomode transducer 20. The information receiver 36 is shown herein as comprising a matching preamplifier 36a, which is not only connected to the IF limiting amplifiers and discriminator 36b, but is also applied to a narrow band AM receiver IF amplifier 104 over a signal path 106. The output of the IF amplifier 104 is coupled by a signal line 108 to an AM detector 110, the output of which is coupled by a suitable line 112 to a signal device 114. Since the object of the calling apparatus is simply to recognize that a signal is being received by the antenna 100 at a suitable frequency so as to pass through the narrow band IF amplifier 104, ordinary AM detection (envelope sensing) is sufficient to provide a substantially DC, or slowly varying AC signal on a line 112 to the signaling device 114.

The IF amplifier 104 is provided with an IF frequency which is one half of the IF frequency of the information channel IF amplifiers (36*b*). Thus, information signals received by the narrow beam antenna 22 and passing through the preamplifier 36*a* will not pass through the narrow band IF amplifier 104, but will pass through the IF amplifier and discriminator 36*b* so as to provide information at the receiver output 40. Thus it is immaterial that call signals passed by the coupler 102 into the transmission line 26 may in fact be mixed with information signals at any point in time.

In order to excite the antenna 100 with carrier frequencies which will, after being mixed with the output of the oscillator 14, provide signals at the narrow band IF frequency (104), a calling or interrogating transceiver, of the same type as that shown in the drawing, is provided with means to cause its oscillator 14 to transmit at a frequency which is substantially half way between the nominal transmit and receive frequencies used for information transmission and reception, as described hereinbefore. However, since any one transceiver is either only nominally frequency controlled by the DC voltage source 64 or is locked to such a transceiver by the AFC 60, there is a need to provide the capability of insuring that an interrogating transmitter will in fact transmit a frequency which, after mixing in the called transceiver, will excite its IF amplifier 104 at a proper frequency so as to get a significant signal to the signaling device 114. In accordance with another aspect of the present invention, there is provided by a low frequency sweep oscillator 116 which is connected by a signal line 118 to an additional contact 120 of the switch 62*a*. Thus the switch 62 *a* is currently shown in the drawing in a position which defines the transceiver as operating in a slave mode wherein its oscillator frequency is caused to track that of signals received at its antenna 22; and the center position of the switch cause operation in a master mode, in which its oscillator is nominally controlled by the DC source (in which case the information-receiving transmitter is controlled by its AFC circuit 60); and a call mode in which the switch 62*a* is transferred to the contact 120, whereby the oscillator 14 is caused to vary, quite slowly, about a frequency which is separated from the nominal frequency established by the DC voltage source 64 by the IF frequency of the narrow band amplifier 104. Thus as the calling station transmits, its frequency is bound to sweep through a frequency separated from the oscillator frequency of the station being called by the IF frequency of the narrow band amplifier 104 of the transceiver being called. The low frequency sweep oscillator 116 may operate at a few, or at tens of hertz. In fact, it may simply comprise frequency division from ordinary line power, when desired in any given case. The only criteria is that its rate of sweep be slow enough so as to provide a signal in the signaling device of the station being called which can be sensed by the signal device 114, whether it be by a slight or a buzzer or other signal device. Actuation of the signal device simply places an operator or notice that he is being called. Conventions may be utilized, such as that a station which is calling setting its switch 62*a* to the center position and thereby assuming the master mode of frequency control, and the station being called places its switch 62*a* in the position shown, thereby assuming the slave mode for information communication. Naturally, any station which has its switch 62*a* connected to the contact 120, so that its oscillator 14 is sweeping, will have difficulty in calling another station which is similarly transmitting with a swept oscillator frequency; however, even in such case, proper conditions (the two oscillators 14 being adjusted apart from each other by an amount equal to the IF frequency of the narrow band IF amplifier 104 in one or the other of them) may occur, and is more likely to occur if the sweeping oscillators operate at very low frequencies, but are at slightly different frequencies from each other. In any event, another convention can be to leave all quiescent transceivers with the switch 62*a* in the position shown, thereby being in a monitoring or reception mode.

Note that the FM information channel can be considered to be a receiver including the preamplifier 36*a* and the AM call channel can be considered to be a receiver including the preamplifier 36*a;* of course, separate preamplifiers may be used with certain aspects of the invention, if desired; but one inventive feature herein is the cost reduction achieved by sharing the preamplifier 36*a*. Also note that any swept carrier signal received by the directional antenna is also coupled, eventually, to the calling channel.

Although the invention has been shown and described with respect to a preferred embodiment thereof, it should be understood by those skilled in the art that the various changes and omissions in the form and detail thereof may be made therein without departing from the spirit and the scope of the invention.

Having thus described a typical embodiment of my invention, that which I claim as new and desire to secure by letters Patent of the United States is:

1. A single oscillator microwave transceiver with calling apparatus, comprising:

- directional antenna means for transmitting and receiving microwaves;
- an FM information receiver having a first IF frequency;
- a microwave mixer feeding said FM receiver;
- mixer input means for coupling energy into said mixer;
- a broad beam antenna;

a narrow band receiver responsive to the output of said mixer, and having a second IF frequency different from said first IF frequency;

a single microwave oscillator;

means for coupling energy from said broad beam antenna into said mixer input means;

means for coupling energy from said oscillator to said directional antenna means for transmission thereby, and for coupling energy received at said directional antenna means and a small portion of the energy of said oscillator to said mixer input means, whereby said single oscillator provides both microwave energy for transmission by said transceiver and microwave energy for mixing with the energy received by said transceiver so as to provide energy at the intermediate frequency of either of said receivers; and signaling means responsive to the output of said narrow band receiver for signaling receipt by said mixer input means of a received signal having a frequency differing from the frequency of said oscillator by said second IF frequency.

2. A single oscillator microwave transceiver with calling apparatus, comprising:

a single microwave oscillator;

receiver means including an information IF amplifier driving an FM discriminator and a call IF amplifier driving an AM detector, said IF amplifiers having different center frequencies;

antenna means for transmitting and receiving microwaves;

means for coupling energy from said oscillator to said antenna means for transmission thereby, and for coupling energy received at said antenna means mixed with a small portion of the energy of said oscillator to the input of said receiver means; and selectively operable means for controlling the frequency of said oscillator selectively, either in response to a DC signal for controlling the information carrier frequency of said oscillator for transmission or reception of information or in response to a slowly varying signal for transmitting a calling signal comprising a carrier wave having a corresponding slowly varying frequency centered about a frequency on the same order of magnitude as said information carrier frequency and differing therefrom by the center frequency of said call IF amplifier.

3. A communication system comprising a pair of tranceivers according to claim 2, said selectively operable means in a first one of said transceivers providing said DC signal, said selectively operable means in a second one of said transceivers providing said slowly varying signal.

4. A single oscillator microwave transceiver with calling apparatus, comprising:

directional antenna means for transmitting and receiving microwaves;

broad beam antenna means;

receiver means including an information IF amplifier driving an FM discriminator and a narrow band call IF amplifier driving an AM detector, said IF amplifiers having different center frequencies;

a microwave mixer;

a matching preamplifier driven by said mixer and feeding said receiver means;

mixer input means for coupling energy into said mixer;

a single microwave oscillator;

means for coupling energy from said broad beam antenna into said mixer input means;

means for coupling energy from said oscillator to said directional antenna means for transmission thereby, and for coupling energy received at said directional antenna means and a small portion of the energy of said oscillator to said mixer input means, whereby said single oscillator provides both microwave energy for transmission by said transceiver and microwave energy for mixing with the energy received by said transceiver so as to provide energy at the center frequency of either of said IF amplifiers;

selectively operable means for controlling the frequency of said oscillator selectively in response to a DC signal for controlling the information carrier frequency of said oscillator for transmission or reception of information or in response to a slowly varying signal for transmitting a calling signal comprising a carrier wave having a corresponding slowly varying frequency centered about a frequency on the same order of magnitude as said information carrier frequency and differing therefrom by the center frequency of said narrow band call IF amplifier; and signal means responsive to the output of said narrow band receiver to signal receipt by said mixer input means of a received signal having a frequency differing from the frequency of said oscillator by said second IF frequency.

5. A communication system comprising a pair of transceivers according to claim 4, said selectively operable means in a first one of said transceivers providing said DC signal, said selectively operable means in a second one of said transceivers providing said slowly varying signal.

6. A single oscillator microwave transceiver with calling apparatus, comprising:

directional antenna means for transmitting and receiving microwaves;

broad beam antenna means for transmitting and receiving microwaves;

receiver means including an information IF amplifier, having a first center frequency, driving an FM discriminator and a narrow band call IF amplifier, having a second center frequency substantially half of said first center frequency, driving an AM detector;

a microwave mixer;

a matching preamplifier driven by said mixer and feeding said receiver means;

mixer input means for coupling energy into said mixer;

a single microwave oscillator;

means for coupling energy from said broad beam antenna means into said mixer input means;

a DC voltage source for providing a DC voltage suitable for controlling the nominal carrier frequency of said microwave oscillator;

an AFC circuit connected to the output of said FM receiver for controlling the carrier frequency of said oscillator to be separated from said nominal carrier frequency by said first IF frequency;

a sweep source of a slowly varying DC voltage for sweeping the carrier frequency of said microwave oscillator slowly about a frequency separated from said nominal carrier frequency by substantially said second IF frequency;

summing means, the output of said summing means being connected to said frequency controlling voltage input of said microwave oscillator;

input means for applying transmitter input modulation to one input of said summing means;

selectively operable means for connecting said AFC circuit, said DC voltage source or said sweep source to a second input of said summing means, alternatively, whereby said microwave oscillator provides a carrier frequency selectively determined by said AFC circuit or by said DC voltage source, which may be frequency modulated in accordance with said transmitter input modulation, or by said sweep source;

means for coupling energy from said oscillator to said directional antenna means for transmission thereby, and for coupling energy received at said directional antenna means and a small portion of the energy of said oscillator to said mixer input means, whereby said single oscillator provides both microwave energy for transmission by said transceiver and microwave energy for mixing with the energy received by said transceiver so as to provide energy at the center frequency of either of said IF amplifiers; and signal means responsive to the output of said narrow band receiver to signal receipt by said mixer input means of a received signal having a frequency differing from the frequency of said oscillator by said second IF frequency.

7. A communication system comprising a pair of transceivers according to claim 6, said selectively operable means in a first one of said transceivers operated to connect either said DC source or said AFC circuit to said summing means, said selectively operable means in a second one of said transceivers operated to connect said sweep source to said summing means.

8. A single oscillator microwave transceiver with calling apparatus, comprising:

broad beam antenna means for transmitting and receiving microwaves;

directional antenna means for transmitting and receiving microwaves;

receiver means including an FM information receiver having a first IF frequency and a narrow band AM receiver having a second IF frequency different from said first IF frequency;

receiver input means for coupling energy into said receiver means;

a single microwave oscillator;

means for coupling energy from said broad beam antenna into said receiver input means;

means for coupling energy from said oscillator to said directional antenna means for transmission thereby, and for coupling energy received at said directional antenna means and a small portion of the energy of said oscillator to said receiver input means, whereby said single oscillator provides both microwave energy for transmission by said receiver and microwave energy for mixing with the energy received by said transceiver so as to provide energy at the intermediate frequency of either of said receivers; and signal means responsive to the output of said narrow band receiver to signal receipt by said receiver input means of a received signal having a frequency differing from the frequency of said oscillator by said second IF frequency.

9. A single oscillator microwave transceiver with calling apparatus, comprising:

antenna means for transmitting and receiving microwaves;

receiver means including an information IF amplifier, having a first center frequency, driving an FM discriminator, and a narrow band call IF amplifier, having a second center frequency substantially half of said first center frequency, driving an AM detector;

a single microwave oscillator having a frequency controlling input;

a DC voltage source for providing a DC voltage suitable for controlling the nominal carrier frequency of said microwave oscillator;

an AFC circuit connected to the output of said FM receiver for controlling the carrier frequency of said oscillator to be separated from said nominal carrier frequency by said first IF frequency;

a sweep source of a slowly varying DC voltage for sweeping the carrier frequency of said microwave oscillator slowly about a frequency separated from said nominal carrier frequency by substantially said second IF frequency;

summing means, the output of said summing means being connected to said frequency controlling input of said microwave oscillator;

input means for applying transmitter input modulation to one input of said summing means;

selectively operable means for connecting said AFC circuit, said DC voltage source or said sweep source to a second input of said summing means, alternatively, whereby said microwave oscillator provides a carrier frequency selectively determined by said AFC circuit or by said DC voltage source, which may be frequency modulated in accordance with said transmitter input modulation, or by said sweep source;

means for coupling energy from said oscillator to said antenna means for transmission thereby, and for coupling energy received at said antenna means and a small portion of the energy of said oscillator to said receiver means, whereby said single oscillator provides both microwave energy for transmission by said transceiver and microwave energy for mixing with the energy received by said transceiver so as to provide energy at the center frequency of either of said IF amplifiers; and signal means responsive to the output of said narrow band receiver to signal receipt by said receiver means of a received signal having a frequency differing from the frequency of said oscillator by said second IF frequency.

10. A communication system comprising a pair of transceivers according to claim 9, said selectively operable means in a first one of said transceivers operated to connect either said DC source or said AFC circuit to said summing means, said selectively operable means in a second one of said transceivers operated to connect said sweep source to said summing means.

* * * * *